United States Patent [19]

Sasajima et al.

[11] Patent Number: 5,289,353
[45] Date of Patent: Feb. 22, 1994

[54] DEVICE FOR NONDETACHABLY MOUNTING A SUPPLEMENTAL HIGH MOUNTED STOP LAMP OR THE LIKE TO A WINDOWPANE

[75] Inventors: Tetsuo Sasajima; Masaru Morikawa, both of Sagamihara; Hiroshige Shinkai, Shimizu; Kihachiro Uchida, Shimizu; Tsutomu Machida, Shimizu, all of Japan

[73] Assignees: Nippon Sheet Glass Co., Ltd.; Koito Manufacturing Co., Osaka, Japan

[21] Appl. No.: 873,827

[22] Filed: Apr. 27, 1992

[30] Foreign Application Priority Data

Apr. 26, 1991 [JP] Japan .................................. 3-122976

[51] Int. Cl.$^5$ .............................................. B60Q 1/26
[52] U.S. Cl. .................... 362/80.1; 362/368; 362/396
[58] Field of Search ............... 362/80.1, 218, 220, 362/368, 396, 369; 340/479

[56] References Cited

U.S. PATENT DOCUMENTS

| | | | |
|---|---|---|---|
| 4,463,411 | 7/1984 | Proctor | 362/61 |
| 4,488,141 | 12/1984 | Ohlenforst et al. | 340/97 |
| 4,591,954 | 5/1986 | Kawamura et al. | 362/61 |
| 4,854,636 | 8/1989 | Greenhalgh et al. | 362/61 X |
| 5,103,382 | 4/1992 | Kondo et al. | 362/80.1 |

*Primary Examiner*—Stephen F. Husar
*Attorney, Agent, or Firm*—Sughrue, Mion, Zinn, Macpeak & Seas

[57] ABSTRACT

A horizontally elongated lamp body of a supplemental high mounted stop lamp is fastened to the rear windowpane of a motor vehicle with looseness in the longitudinal direction of the lamp body relative to the windowpane. Molded from a plastic, the lamp body is therefore capable of thermal expansion or contraction in its longitudinal direction without the danger of detachment from the windowpane.

8 Claims, 9 Drawing Sheets

DEVICE FOR NONDETACHABLY MOUNTING A SUPPLEMENTAL HIGH MOUNTED STOP LAMP OR THE LIKE TO A WINDOWPANE

BACKGROUND OF THE INVENTION

This invention relates to electric lamps in general and, in particular, to a supplemental high mounted stop lamp for motor vehicles. More specifically, the invention deals with such a lamp featuring improved means for mounting the lamp to a windowpane, typically the rear windowpane of a motor vehicle, against the likelihood of accidental detachment therefrom in the face of the thermal expansion or contraction of the lamp body and the windowpane at different rates.

The high mounted stop lamp is finding ever increasing use on motor vehicles, passenger cars in particular, to supplement the stop lamp system and to provide a signal through intervening vehicles to operators of following vehicles. Some supplemental stop lamps are mounted high on the interior surface of the rear windowpane. Typically, such a lamp comprises a row of light emitting diodes mounted to a printed circuit board and electrically connected to the conductive pattern thereon. The light emittering diodes together with the printed circit board is housed in a horizontally elongated, boxlike lamp body with an open side which is closed by a lens or lenses and which is contoured to fit the inside curvature of the rear windowpane.

Conventionally, this type of supplemental stop lamp was mounted by bonding the open side of the lamp body directly to the rear windowpane. This practice is objectionable because the lamp body, which typically is of a plastic, and the windowpane, being of glass, have different rates of thermal expansion. The lamp body was easy to detach from the windowpane as it repeatedly underwent thermal expansion and contraction at a rate different from that of the windowpane with changes in temperature over the years. The lamp body was even more susceptible to detachment because of its elongate shape, which shape made it far more liable to expand or contract in its longitudinal direction than in its transverse direction.

SUMMARY OF THE INVENTION

The present invention solves the problem of how to mount a supplemental high mounted stop lamp or like electric lamp to a windowpane such as the rear windowpane of a motor vehicle against the danger of accidental detachment therefrom despite the unavoidable thermal expansion or contraction of the lamp body and the windowpane at different rates.

Broadly, the invention may be summarized as an electric lamp assembly to be mounted to a windowpane against the danger of accidental detachment therefrom, comprising an elongate lamp body having a rate of thermal expansion different from that of the windowpane, and light source means within the lamp body. Also included are a pair of fastener means for fastening the opposite ends of the lamp body to the windowpane with looseness in the longitudinal direction of the lamp body relative to the windowpane.

Thus the lamp body is capable of thermal expansion or contraction in its longitudinal direction relative to the windowpane. The lamp body, or the complete lamp assembly, is therefore not to fall off the windowpane no matter how many times such thermal expansion or contraction is repeated throughout the expected lifetime of the lamp assembly or of the motor vehicle incorporating the lamp assembly as in the form of a supplemental high mounted stop lamp.

The above and other features and advantages of this invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

Figure 1:
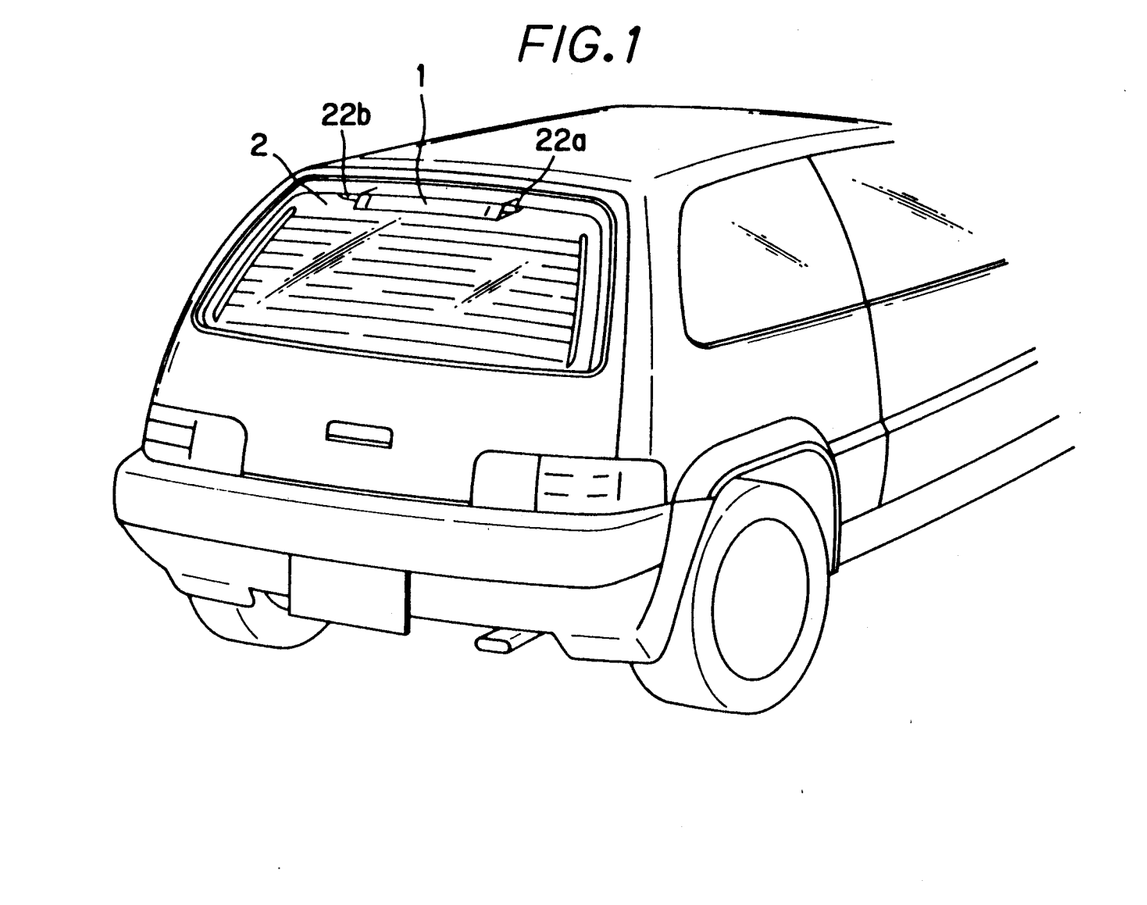
FIG. 1 is a partial perspective view of a motor vehicle with the supplemental stop lamp mounted high on its rear windowpane in accordance with the invention.

The present invention is shown in FIG. 1 as embodied in the supplemental stop lamp 1 mounted high on the interior surface of the rear windowpane 2 of a motor vehicle. The stop lamp 1 could, however, be of course mounted near the bottom edge of the windowpane 2.

Figure 2:
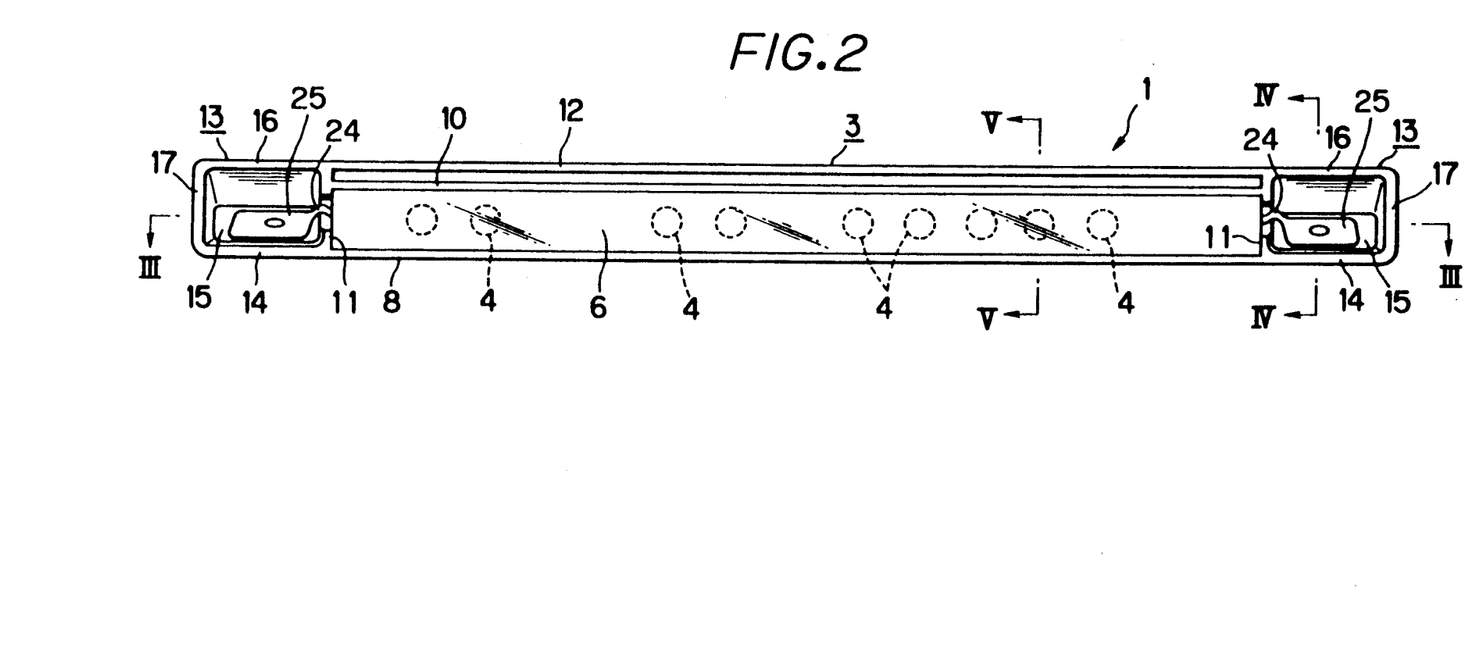
FIG. 2 is an enlarged front elevation of the supplemental high mounted stop lamp of FIG. 1.
Figure 3:
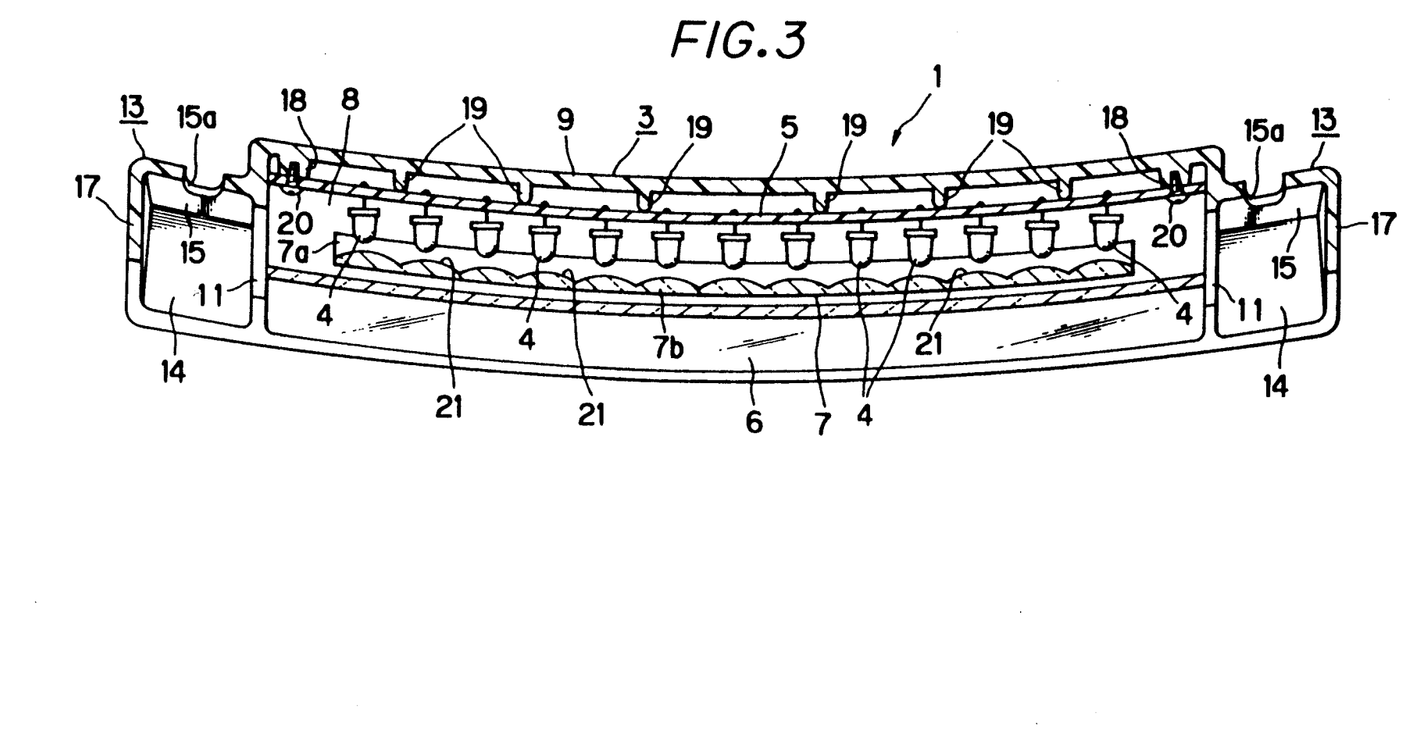
FIG. 3 is a horizontal section through the lamp, taken along the line III—III in FIG. 2.

As illustrated in front elevation in FIG. 2 and in horizontal section in FIG. 3, the supplemental high mounted stop lamp 1 comprises a horizontally elongated, forwardly open, relatively shallow boxlike lamp body 3. Light sources 4 such as, typically light emitting diodes, are aligned within the lamp body 3 and mounted to a printed circuit board 5. It is understood that the printed circuit board 5 has formed thereon the usual conductive pattern, not shown, constituting part of a power supply circuit for the light sources 4. A planar outer lens 6 covers the open front side of the lamp body 3, and a planoconvex inner lens system 7 is disposed between light sources 4 and outer lens 6.

Figure 5:
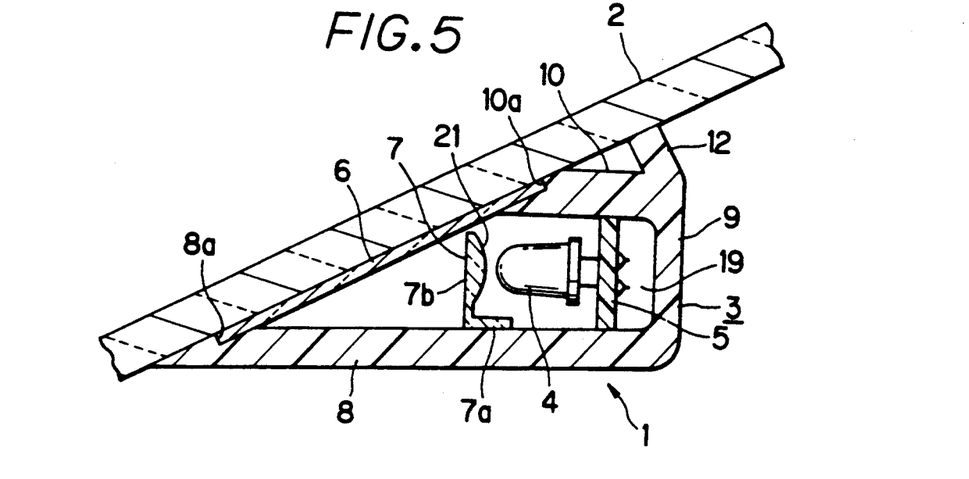
FIG. 5 is another enlarged vertical section through the lamp, taken along the line V—V in FIG. 2.
Figure 6:
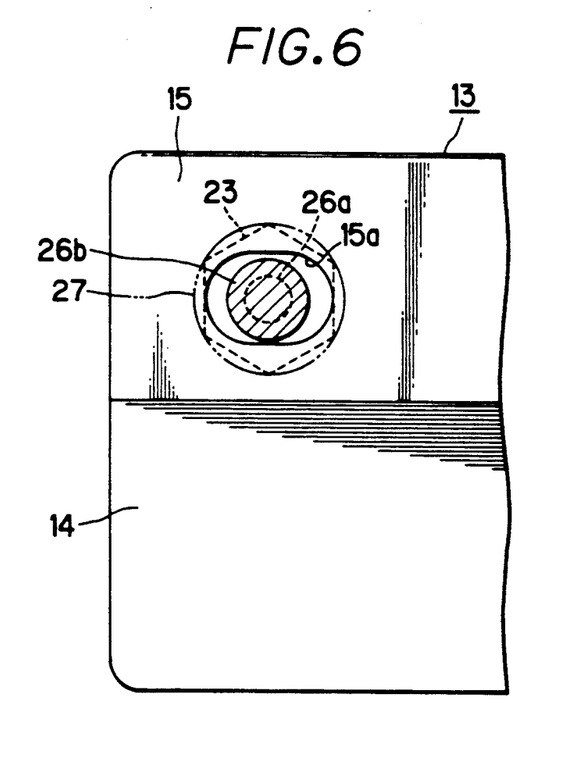
FIG. 6 is a section taken along the line VI—VI in FIG. 4.

As will be seen also from FIGS. 2 and 3 taken together with FIG. 5, the lamp body 3 is a one piece molding of a rigid, opaque plastic. Thus the lamp body 3 integrally comprises: (a) a bottom wall 8 which is gently convexed forwardly as seen in a plan view as in Flg. 3; (b) a rear wall 9 erected upwardly from the rear edge of the bottom wall 8; (c) a top wall 10 extending forwardly from the top edge of the rear wall 9 to an extent approximately one third of the width of the bottom wall 8; and (d) a pair of side walls 11. FIGS. 2 and 5 also reveal a fin 12 extending upwardly and forwardly from the rear edge of the top wall 10.

Figure 4:
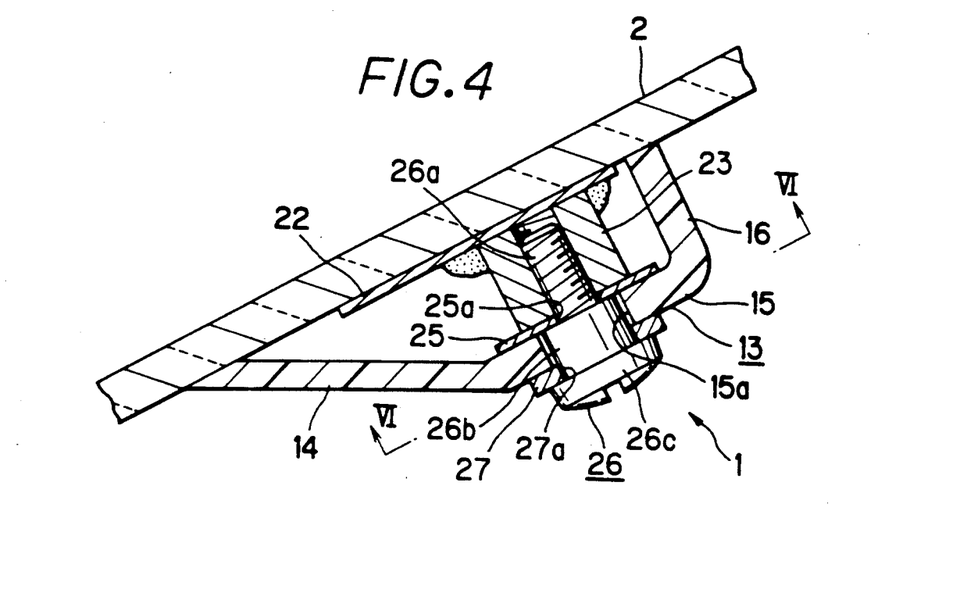
FIG. 4 is a still more enlarged vertical section through the lamp, taken along the line IV—IV in FIG. 2.

The reference numeral 13 in FIGS. 2-4 generally designates a pair of lamp body extensions formed at both longitudinal or horizontal ends of the lamp body 3 for use in mounting the stop lamp 1 to the vehicle windowpane 2. Formed in one piece with the lamp body 3, each extension 13 comprises: (a) a bottom wall 14 forming a coplanar extension of the lamp body bottom wall 8, with a front edge disposed flush with that of the lamp body bottom wall, and extending rearwardly to an extent approximately two thirds of the width of the lamp body bottom wall; (b) a rear wall 15 extending upwardly and rearwardly from the rear edge of the extension bottom wall 14 so as to be in parallel spaced relationship to the windowpane 2; (c) a top wall 16 extending upwardly and forwardly from the top edge of the extension rear wall 15; and (d) a side wall 17 closing the lateral end of the extension 13.

As shown in FIG. 3, the printed circuit board 5 is held against a series of ribs 19 and a pair of bosses 18 formed in a row on the lamp body bottom wall 9. As will be seen also from FIG. 8, the printed circuit board 5 is mounted in position by a pair of screws 20 extending through holes 5a in both ends of the printed circuit board and engaged in tapped holes 18a in the bosses 18.

FIG. 5 indicates that the outer lens 6 has its top and bottom edges engaged respectively in recesses 8a and 10a in the lamp body bottom wall 8 and lamp body top wall 10 and is secured to the lamp body 3 as by fusion or adhesion. Thus the outer lens 6 is convexed forwardly and upwardly in conformity with the contour of the open front side of the lamp body 3, in order to be held closely against the vehicle windowpane 2.

FIG. 5 further indicates that the inner lens system 7 is an integral combination of a mounting section 7a and a lens section 7b and is generally L shaped as seen in a cross section as in this figure. The lens section 7b is disposed forwardly of the light sources 4 on the printed circuit board 5 as the mounting section 7a is seated on the lamp body bottom wall 8 and secured thereto as by fusion or adhesion. The lens section 7b is formed to include a series of converging lens elements 21 which are individually opposed to the light sources 4 for producing parallel rays of light oriented forwardly of the stop lamp 1, or rearwardly of the motor vehicle.

Figure 7:
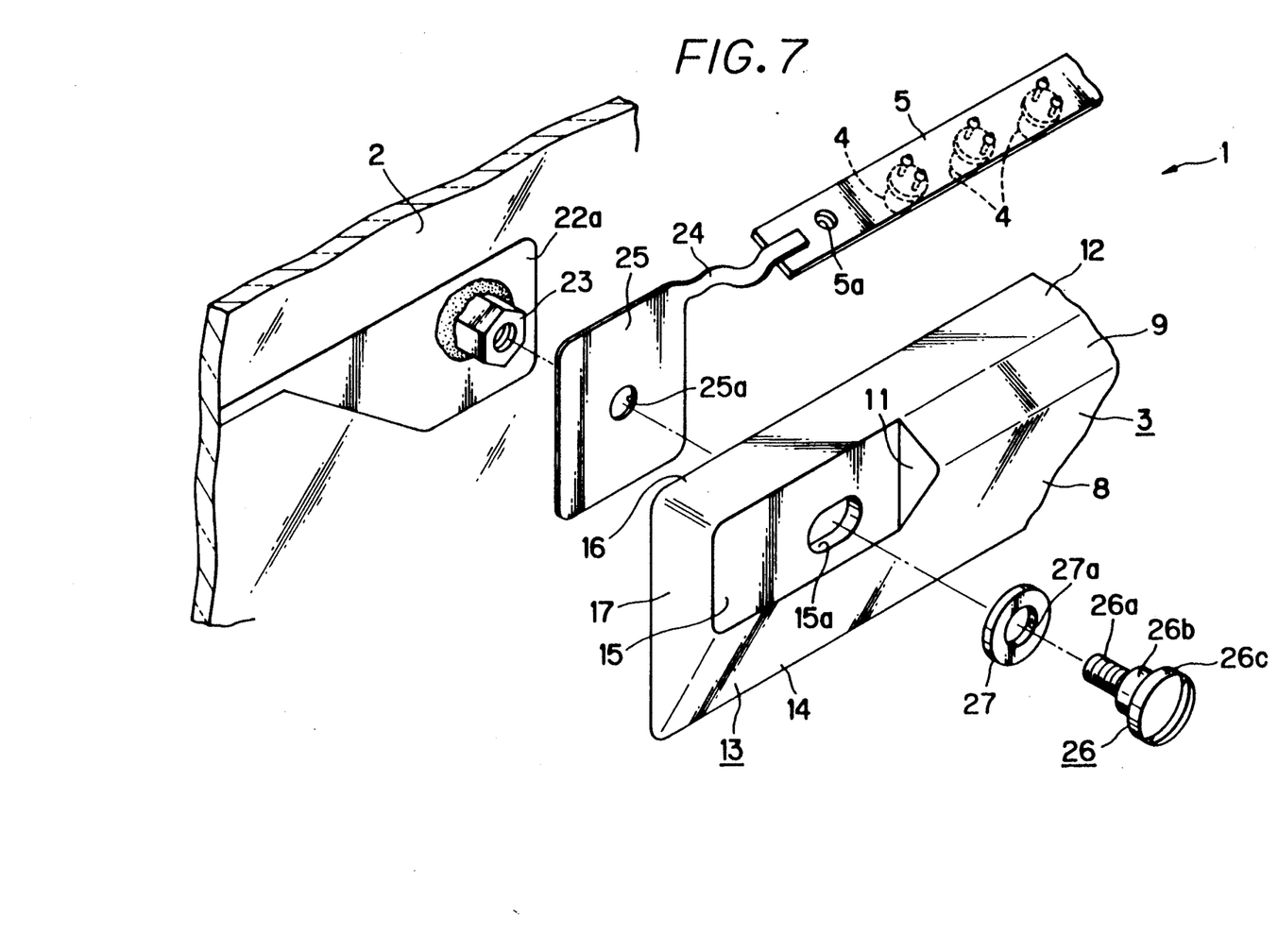
FIG. 7 is an exploded, fragmentary perspective view showing how the lamp is mounted to the windowpane of the vehicle at one end thereof.

As depicted in FIG. 1, and in more detail in FIGS. 4 and 7, a pair of electrically conductive foils or patterns 22a and 22b are formed on the interior surface of the vehicle rear windowpane 2 as by baking. The single conductive pattern shown in FIG. 4 is designated 22 as it can be either of the two conductive foils 22a and 22b. The conductive foils 22a and 22b are electrically connected to the positive and negative sides, respectively, of a battery or like power supply, not shown, mounted on the motor vehicle. A pair of nuts 23 of electrically conductive material, usually metal, are soldered or otherwise firmly attached to the respective conductive foils 22a and 22b in electrically conducting relationship thereto. These nuts serve therefore as supply terminals for the stop lamp 1.

For electrically connecting the conductive foils 22a and 22b to the printed circuit board 5, there are provided a pair of sheet metal connectors 25 of square shape, FIGS. 2, 4 and 7, which preferably are covered in part with films of electrically insulating material. Each sheet metal connector 25 is formed to include a flexible arm 24 which is electrically connected to the unshown conductive pattern on the printed circuit board 5.

At 26 in FIGS. 4, 6, 7 and 8 is seen a mounting bolt inserted in and through a clearance hole or slot 15a in each lamp body extension rear wall 15 and a hole 25a in each sheet metal connector 25 and engaged in each nut 23. It will be seen that the stop lamp 1 is fastened to the vehicle rear windowpane 2 by a pair of such mounting bolts 26 with the associated nuts 23.

Each mounting bolt 26 comprises a threaded shank portion 26a, a blank shank portion 26b and a heat 26c. The threaded shank portion 26a has a major diameter greater than the diameter of the hole 25a in each sheet metal connector 25 and a minor diameter less than the diameter of the hole 25a. The blank shank portion 26b has a diameter somewhat more than the major diameter of the threaded shank portion 26a, and a length somewhat more than the thickness of each lamp body extension rear wall 15. The head 26c is approximately twice in diameter than the blank shank portion 26b.

Preferably, and as shown, each mounting bolt 26 may be provided with a washer 27, which is caught between each lamp body extension rear wall 15 and the head 26c of the mounting bolt. Fabricated from Teflon (trademark) or like wear resistant material with a low coefficient of friction, the washer 27 has a hole 27a with a diameter somewhat more than that of the blank shank portion 26b of each mounting bolt 26.

For mounting the stop lamp 1, the pair of mounting bolts 26 with the washers 27 on their blank shank portions 26b may be inserted in and through the clearance slots 15a in the lamp body extension rear walls 15 and then into the holes 25a in the sheet metal connectors 25. The mounting bolts 26 may be turned into the holes 25a since the diameter of these holes is more than the minor diameter, and less than the major diameter, of the threaded shank portions 26a of the mounting bolts 26. Incidentally, the arms 24 of the sheet metal connectors 25 should be sufficiently long to develop a slack, as depicted in FIG. 7, when the mounting bolts 26 are engaged as above in the holes 25a.

Then, with the stop lamp 1 positioned on the rear windowpane 2, the threaded shank portions 26a of the mounting bolts 26 may be turned into the nuts 23 which have been soldered to the conductive foils 22a and 22b on the windowpane. The mounting bolts 26 should be turned fully until their blank shank portions 26b butt endwise against the nuts 23 via the sheet metal connectors 25, as best pictured in FIG. 4.

The mounting of the stop lamp 1 has now been completed. The pair of nuts or supply terminals 23 have been electrically connected via the sheet metal connectors 25 to the conductive pattern on the printed circuit board 5 and thence to the light sources 4 thereon. The outer lens 6 will be held against the surface of the windowpane 2.

Although the mounting bolts 26 have been turned fully into the nuts 23, the lamp body extension rear walls 15 are nevertheless movable, within the limits determined by the length of the clearance slots 15a, in the longitudinal direction of the stop lamp 1 as the blank shank portions 26b of the mounting bolts butt against the nuts via the sheet metal connectors 25. The movement of the lamp body extension rear walls 15 relative to the mounting bolts 26 will become easier by employing the washers 27 as in this embodiment. The use of such washers is not absolutely necessary, however.

Thus the mounting bolts 26 will permit the extension or contraction of the lamp body 3 in its longitudinal direction due to changes in temperature. There is therefore practically no possibility of the detachment of the stop lamp 1 from the windowpane 2 due to the difference between the rates of thermal expansion of the windowpane 2 and lamp body 3. No destruction of the lamp body extensions 13 or other parts will occur, nor will the lamp body develop stresses.

Alternate Form

Figure 9:
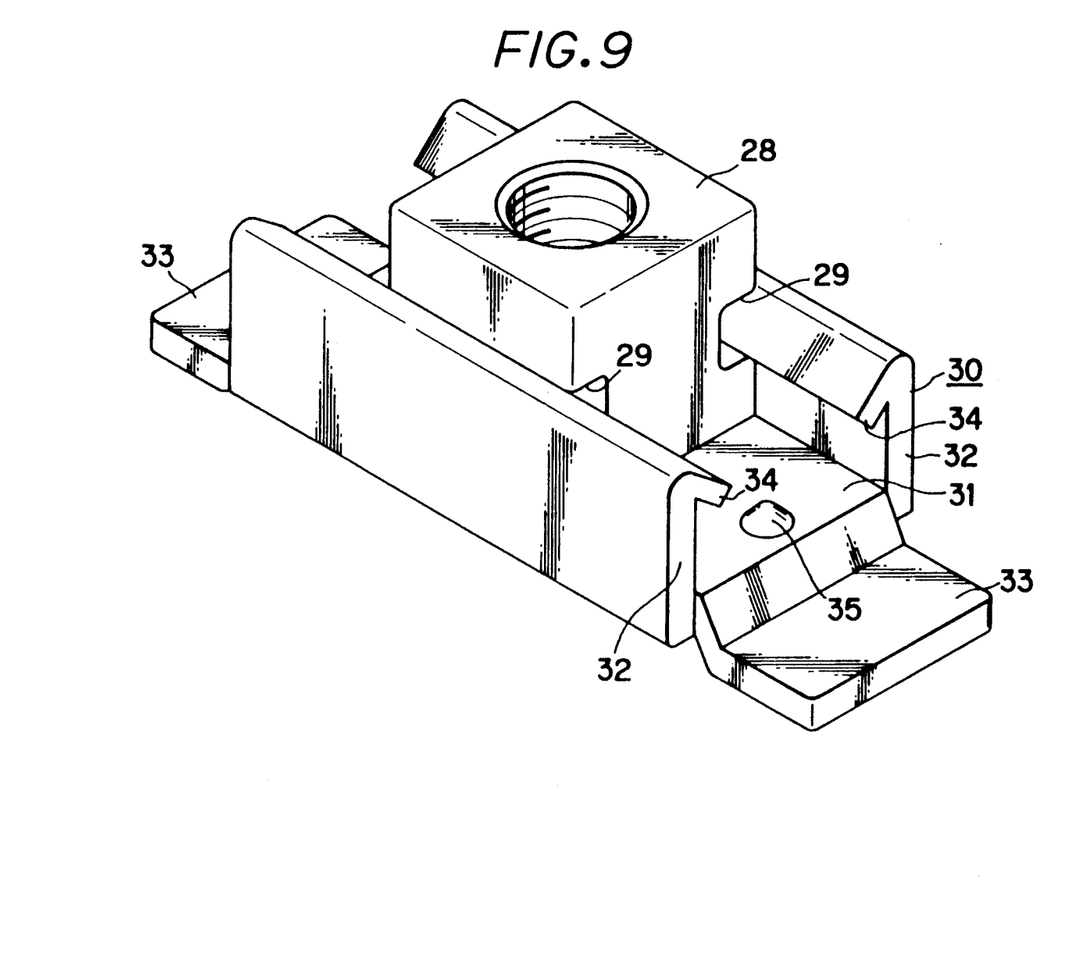
FIG. 9 is a perspective view of one guide rail and one nut in an alternate embodiment of the invention.
Figure 10:
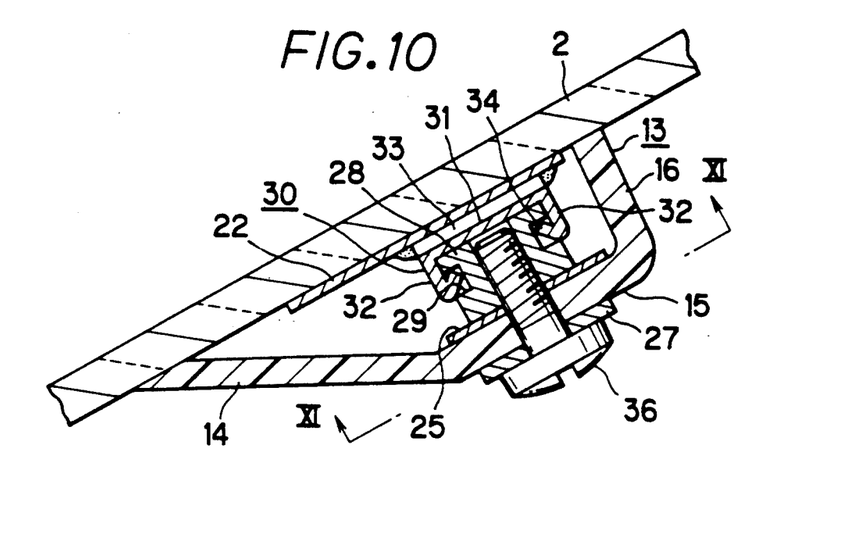
FIG. 10 is a section similar to FIG. 4 but showing the alternate embodiment of the invention.
Figure 11:
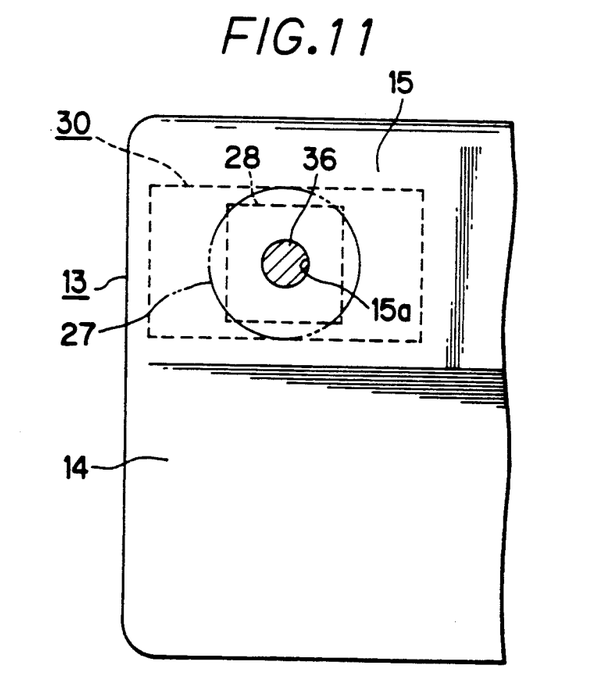
FIG. 11 is a section taken along the line XI—XI in FIG. 10.

An alternate form of supplemental stop lamp according to this invention employs a pair of square nuts 28 of electrically conductive material, one shown in FIGS. 9-11, in places of the hexagon nuts 23 of the preceding embodiment. Each nut 28 has a pair of parallel spaced grooves 29 formed in its two opposite surfaces so as to extend in a direction perpendicular to its axis. Unlike the nuts 23 of the preceding embodiment, the nuts 28 are not secured to the windowpane 2 but are coupled thereto for sliding movement in the longitudinal direction of the stop lamp, as will be detailed hereafter.

In order to permit such displacement of the nuts 28 relative to the windowpane 2, this alternate embodiment employs a pair of guide rails 30 each configured as best pictured in FIG. 9. Also made from electrically conductive material, the guide rails 30 are soldered to the conductive foils 22 on the windowpane 2.

Each guide rail 30 comprises a web 31 of rectangular shape, having a width somewhat more than the length of each side of the square nut 28 and a length approximately twice its own width. A pair of side flanges 32 are bent right angularly from the opposite sides of the web 31 in a direction away from the windowpane 2. The side flanges 32 have rims 34 angled toward the web 31 for sliding engagement in the grooves 29 in the nut 28, so that this nut is slidable longitudinally of the guide rail 30, and therefore of the stop lamp, but is not disengageable therefrom in a direction away from the windowpane 2. FIG. 10 clearly indicates that the angled rims 34 of the side flanges 32 are bottomed against the grooves 29, either resiliently or otherwise, thereby eliminating looseness between nut 28 and guide rail 30.

Each guide rail 30 has a pair of bosses 35, one seen in FIG. 9, formed on its web 31. Positioned adjacent the opposite ends of the web 31, these bosses serve as limit stops for preventing the disengagement of the nut 28 from the guide rail.

Each guide rail 30 further comprises a pair of mounting fins 33 which are angled toward the windowpane 2 from the opposite ends of the web 31 and then bent into parallel relationship with the web. As shown in FIG. 10, the mounting fins 33 of each guide rail 30 are soldered to one of the conductive foils 22 on the interior side of the windowpane 2. The guide rails 30 are thus electrically connected to the respective conductive foils 22, and so are the nuts 28, which then function as supply terminals for the stop lamp.

The alternate high mounted stop lamp can be analogous in the other details of construction with the FIGS. 1-8 stop lamp 1 except that the pair of lamp body extension 13 have holes 15a of simple circular shape, instead of the clearance slots of the preceding embodiment, formed in their rear walls 15.

Figure 8:
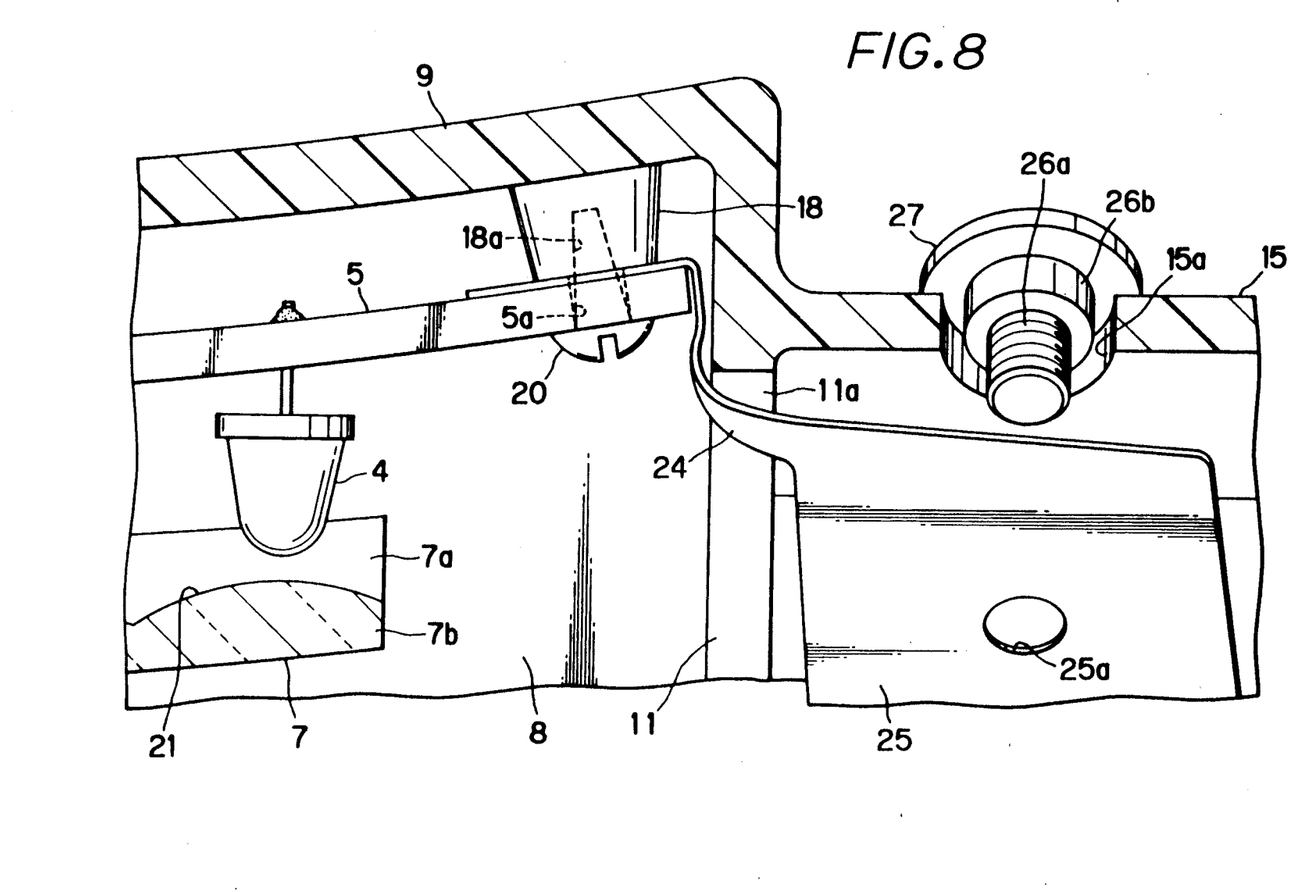
FIG. 8 is a horizontal section somewhat similar to FIG. 3 but showing one end portion of the lamp on an even more enlarged scale.

For mounting this alternate stop lamp, the pair of mounting bolts 36 with the washers 27 thereon may be inserted in and through the holes 15a in the lamp body extension rear walls 15 and the holes 25a, FIGS. 7 and 8, in the sheet metal connectors 25. Then, positioned on the windowpane 2, the mounting bolts 36 may be turned into the nuts 28 on the guide rails 30, as illustrated in FIG. 10. The light sources of the stop lamp will then be connected in circuit with the pair of nuts or supply terminals 28 via the sheet metal connectors 25.

The lamp body, not shown in FIGS. 9-11, will be pressed hard against the windowpane 2 as the mounting bolts 36 are turned fully into the nuts 28 as above. By reaction, then, the nuts 28 will be forced away from the windowpane 2, resulting in an even more positive engagement of the nuts with the guide rails 30, without any looseness therebetween. The lamp body is nevertheless capable of thermal extension or contraction relative to the windowpane 2 as the pair of nuts 28 slide along the respective guide rails 30. Thus the alternate stop lamp gains the same advantages as set forth in connection with the FIGS. 1-8 embodiment.

Despite the foregoing detailed disclosure, it is not desired that the present invention be limited by the exact details of the illustrated embodiments. For example, instead of mounting the light emitting diodes on the printed circuit board, they could be mounted to suitable retainers, with a flexible printed circuit board disposed behind such retainers for feeding the light sources. Additional modifications, alterations or adaptations of this invention may be resorted to without departure from the scope of the following claims.

What is claimed is:

1. An electric lamp assembly to be mounted to a windowpane against the danger of accidental detachment therefrom, the windowpane having one rate of thermal expansion, the lamp assembly comprising:
    (a) an elongate lamp body having a pair of opposite ends, the lamp body having another rate of thermal expansion;
    (b) light source means within the lamp body; and
    (c) a pair of fastener means for fastening the opposite ends of the lamp body to the windowpane with looseness in the longitudinal direction of the lamp body relative to the windowpane;
    (d) whereby the lamp body is capable of thermal expansion or contraction in its longitudinal direction relative to the windowpane.

2. An electric lamp assembly to be mounted to a windowpane against the danger of accidental detachment therefrom, the windowpane having one rate of thermal expansion, the lamp assembly comprising:
    (a) an elongate lamp body having a pair of opposite ends, the lamp body having another rate of thermal expansion;
    (b) light source means within the lamp body;
    (c) a pair of power supply means to be firmly attached to the windowpane;
    (d) connector means for electrically connecting the light source means to the power supply means; and
    (e) a pair of fastener means of electrically conductive material for fastening the opposite ends of the lamp body to the respective power supply means on the windowpane with looseness in the longitudinal direction of the lamp body with respect to the windowpane and for electrically connecting the connector means to the power supply means;
    (f) whereby the lamp body is capable of thermal expansion or contraction in its longitudinal direction relative to the windowpane.

3. An electric lamp assembly to be mounted to a windowpane against the danger of accidental detachment therefrom, the windowpane having one rate of thermal expansion, the lamp assembly comprising:
  (a) an elongate lamp body having a pair of opposite ends, the lamp body having another rate of thermal expansion;
  (b) light source means within the lamp body;
  (c) a pair of nuts to be secured to the windowpane; and
  (d) a pair of bolts for fastening the opposite ends of the lamp body to the pair of nuts on the windowpane, the bolts extending through clearance openings in the lamp body in order to permit looseness of the lamp body in the longitudinal direction thereof relative to the windowpane;
  (e) whereby the lamp body is capable of thermal expansion or contraction in its longitudinal direction relative to the windowpane.

4. An electric lamp assembly to be mounted to a windowpane against the danger of accidental detachment therefrom, the windowpane having one rate of thermal expansion, the lamp assembly comprising:
  (a) an elongate lamp body having a pair of opposite ends, the lamp body having another rate of thermal expansion;
  (b) light source means within the lamp body;
  (c) a pair of power supply means to be firmly attached to the windowpane;
  (d) connector means for electrically connecting the light source means to the power supply means;
  (e) a pair of nuts of electrically conductive material to be secured respectively to the pair of power supply means on the windowpane; and
  (f) a pair of bolts for fastening the opposite ends of the lamp body to the pair of nuts on the windowpane and for electrically connecting the connector means to the power supply means, the bolts extending through clearance openings in the lamp body in order to permit looseness of the lamp body in the longitudinal direction thereof relative to the windowpane;
  (g) whereby the lamp body is capable of thermal expansion or contraction in its longitudinal direction relative to the windowpane.

5. An electric lamp assembly to be mounted to a windowpane against the danger of accidental detachment therefrom, the windowpane having one rate of thermal expansion, the lamp assembly comprising:
  (a) an elongate lamp body having a pair of opposite ends, the lamp body having another rate of thermal expansion;
  (b) light source means within the lamp body;
  (c) a pair of guide rails to be secured to the windowpane; and
  (d) a pair of fastener means for fastening the opposite ends of the lamp body to the pair of guide rails on the windowpane against the possibility of detachment therefrom, the fastener means being to be slidably engaged with the guide rails for displacement in the longitudinal direction of the lamp body;
  (e) whereby the lamp body is capable of thermal expansion or contraction in its longitudinal direction relative to the windowpane.

6. The electric lamp assembly of claim 5 wherein the fastener means comprises:
  (a) a pair of nuts to be slidably engaged with the respective guide rails; and
  (b) a pair of bolts for fastening the opposite ends of the lamp body to the nuts on the guide rails.

7. An electric lamp assembly to be mounted to a windowpane against the danger of accidental detachment therefrom, the windowpane having one rate of thermal expansion, the lamp assembly comprising:
  (a) an elongate lamp body having a pair of opposite ends, the lamp body having another rate of thermal expansion;
  (b) light source means within the lamp body;
  (c) a pair of power supply means to be firmly attached to the windowpane;
  (d) connector means for electrically connecting the light source means to the power supply means; and
  (e) a pair of guide rails of electrically conductive material to be secured respectively to the pair of power supply means on the windowpane; and
  (f) a pair of fastener means for fastening the opposite ends of the lamp body to the pair of guide rails on the windowpane against the possibility of detachment therefrom and for electrically connecting the connector means to the power supply means, the fastener means being to be slidably engaged with the guide rails for displacement in the longitudinal direction of the lamp body;
  (g) whereby the lamp body is capable of thermal expansion or contraction in its longitudinal direction relative to the windowpane.

8. The electric lamp assembly of claim 7 wherein the fastener means comprises:
  (a) a pair of nuts to be slidably engaged with the respective guide rails; and
  (b) a pair of bolts for fastening the opposite ends of the lamp body to the nuts on the guide rails.

* * * * *